June 27, 1939.  E. G. BEIDERMAN  2,163,930
WELDING MACHINE
Filed Aug. 6, 1937   5 Sheets-Sheet 1

INVENTOR.
Edward G. Beiderman
BY Barnes, Kisselle, Laughlin & Raisch
ATTORNEYS.

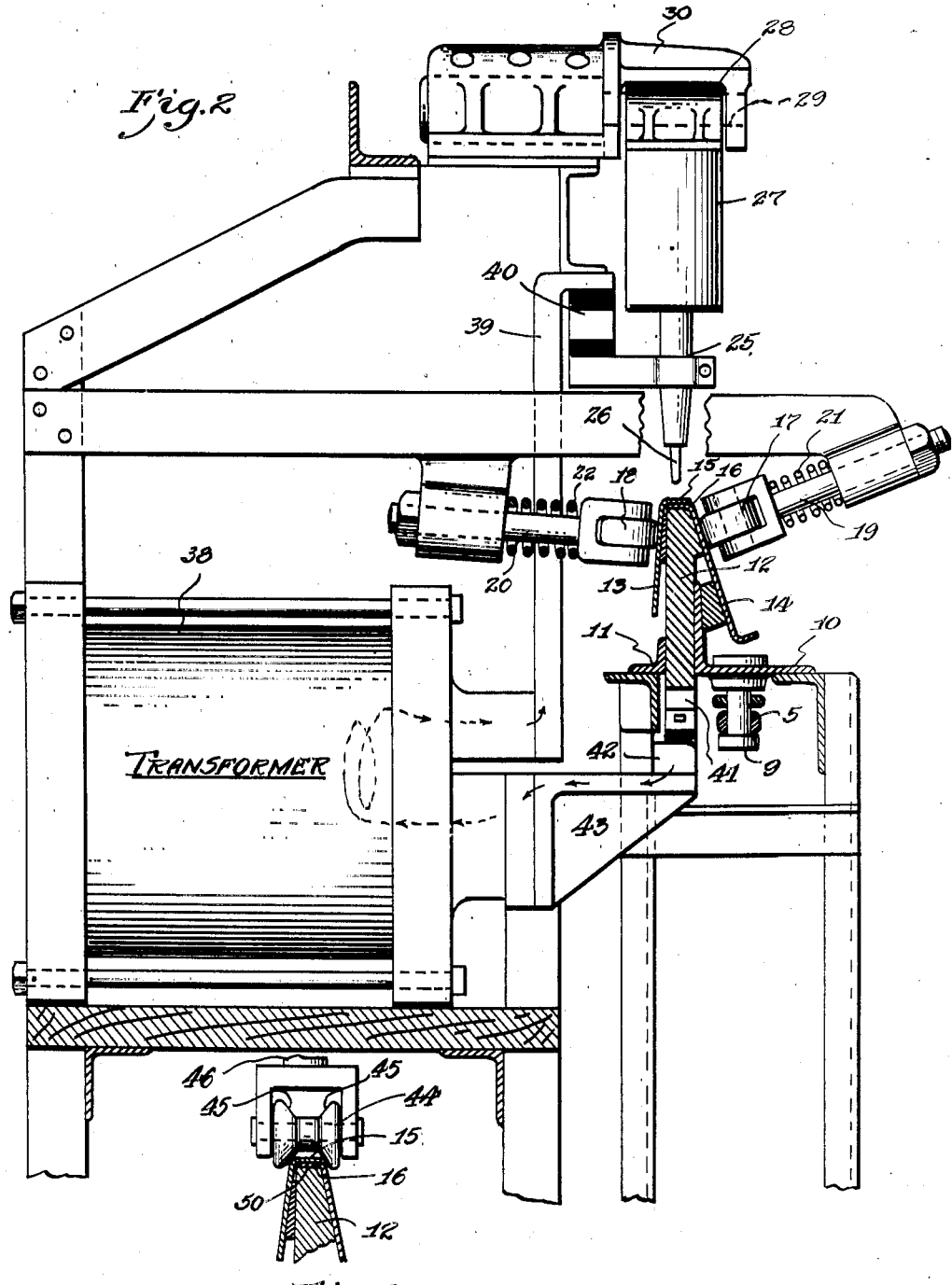

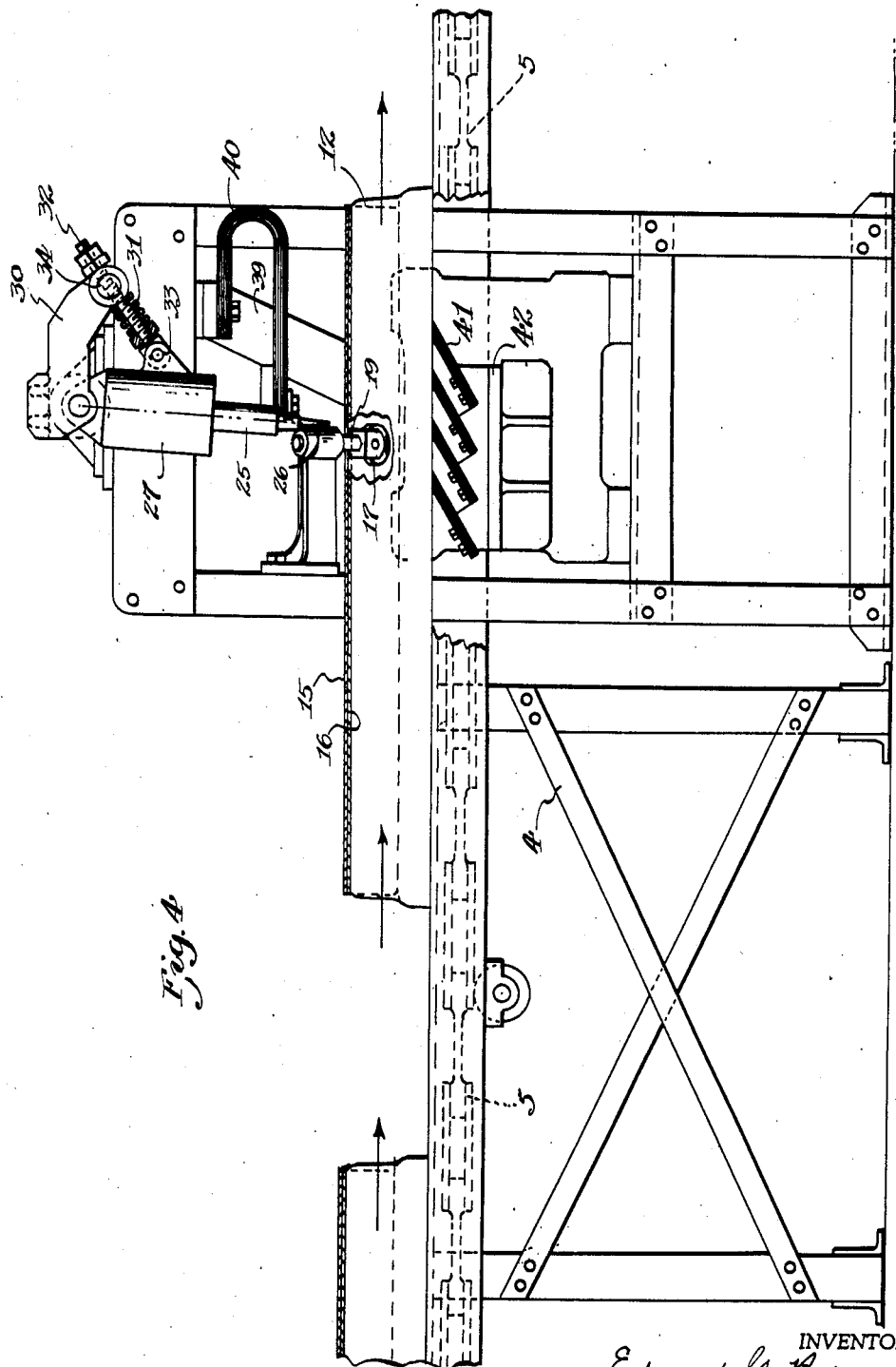

June 27, 1939.　　　E. G. BEIDERMAN　　　2,163,930
WELDING MACHINE
Filed Aug. 6, 1937　　　5 Sheets-Sheet 4
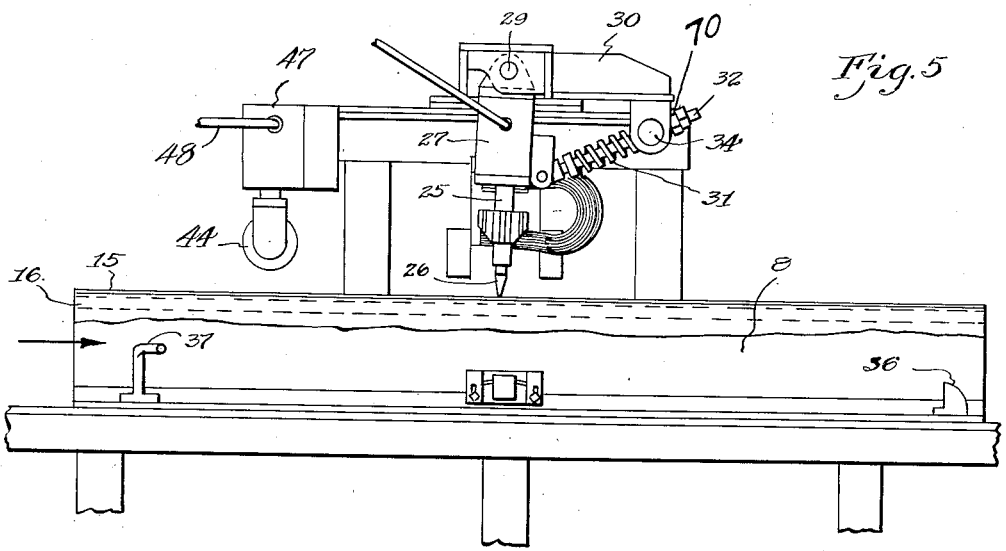
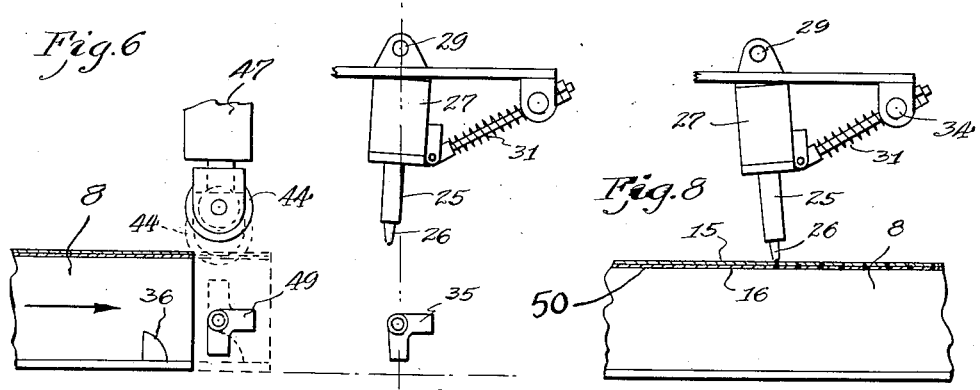
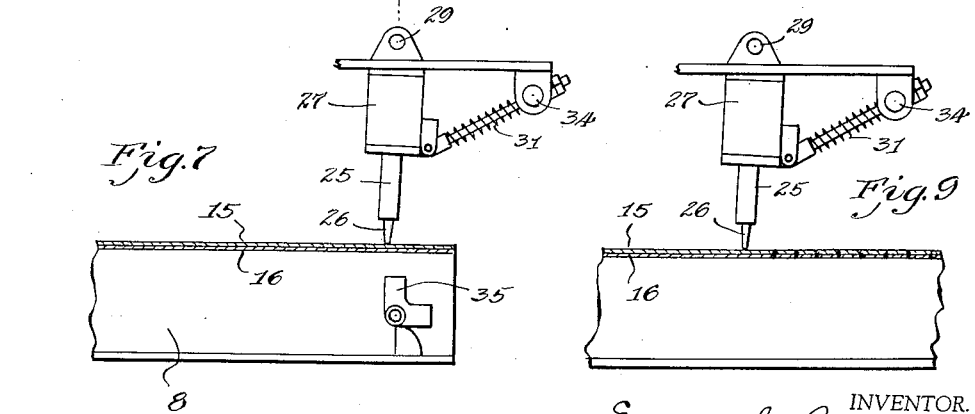
INVENTOR.
Edward G. Beiderman
BY Barnes, Kisselle, Laughlin & Raisch
ATTORNEYS

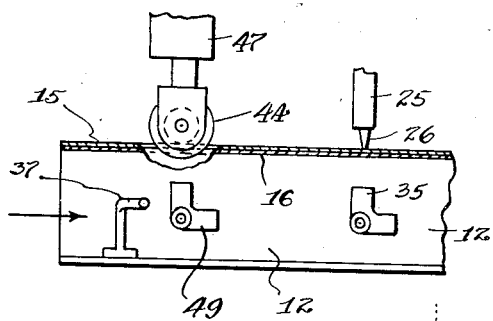
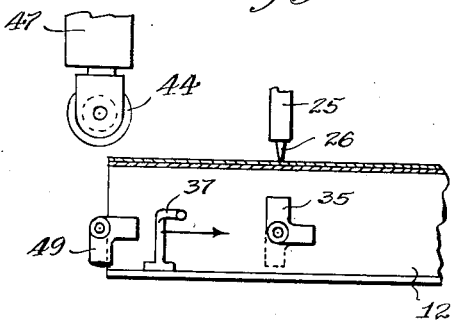
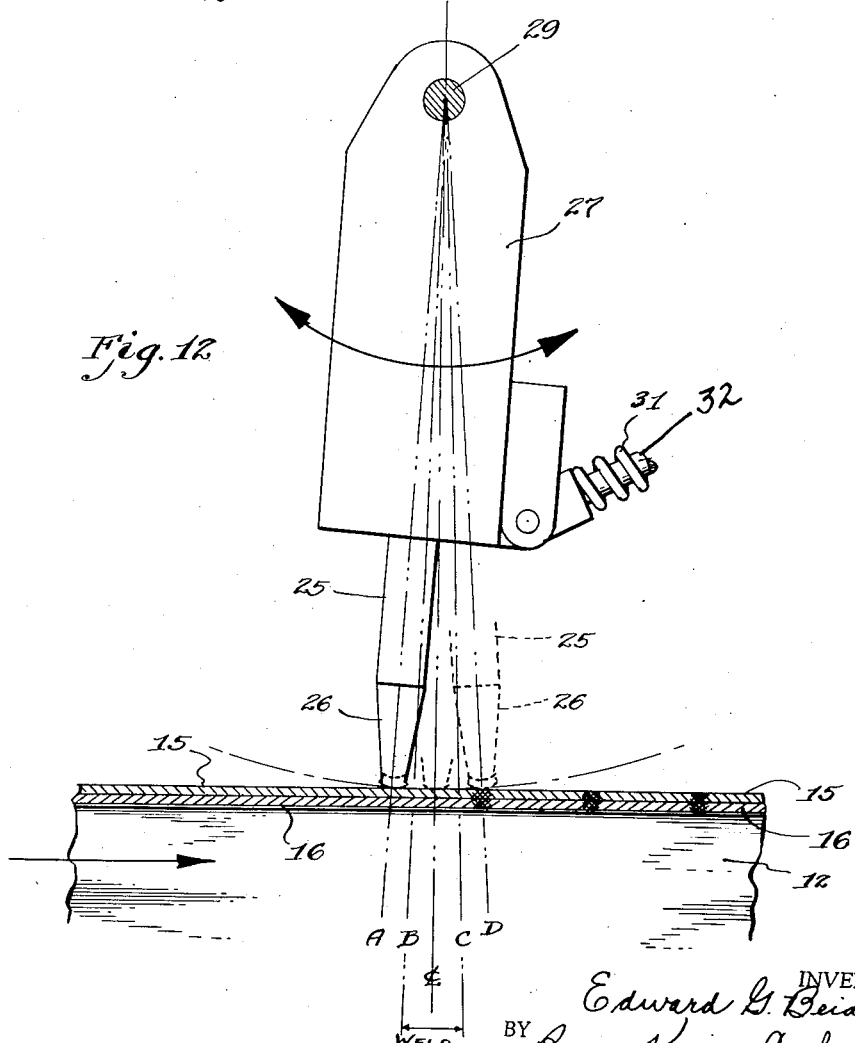

Patented June 27, 1939

2,163,930

UNITED STATES PATENT OFFICE 2,163,930

WELDING MACHINE

Edward G. Beiderman, Detroit, Mich., assignor to General Motors Corporation, Detroit, Mich., a corporation of Delaware Application August 6, 1937, Serial No. 157,769

8 Claims. (Cl. 219—4)

This invention relates to a welding machine and more particularly to a combined welder and work conveyor which operates automatically.

It is the object of this invention to produce a welding machine which is more efficient and economical in operation and welds better than those machines heretofore used.

In the drawings:

Fig. 2 is a vertical section through the work conveying apparatus showing the welding machine in elevation.

Fig. 3 is a detail vertical sectional view showing a modified but preferred form of the device for holding the work in position upon the jig during the welding operation.

Fig. 4 is a side elevation partly in section showing the welding machine and parts of the conveyor adjacent thereto.

Fig. 5 is a fragmentary side elevation of the welding head and jig.

Figs. 6, 7, 8, 9, 10 and 11 are details showing the operation of the welding head and the controls therefor.

Fig. 12 is an enlarged detail showing the several positions of the upper welding electrode during the welding operation.

Figure 1:
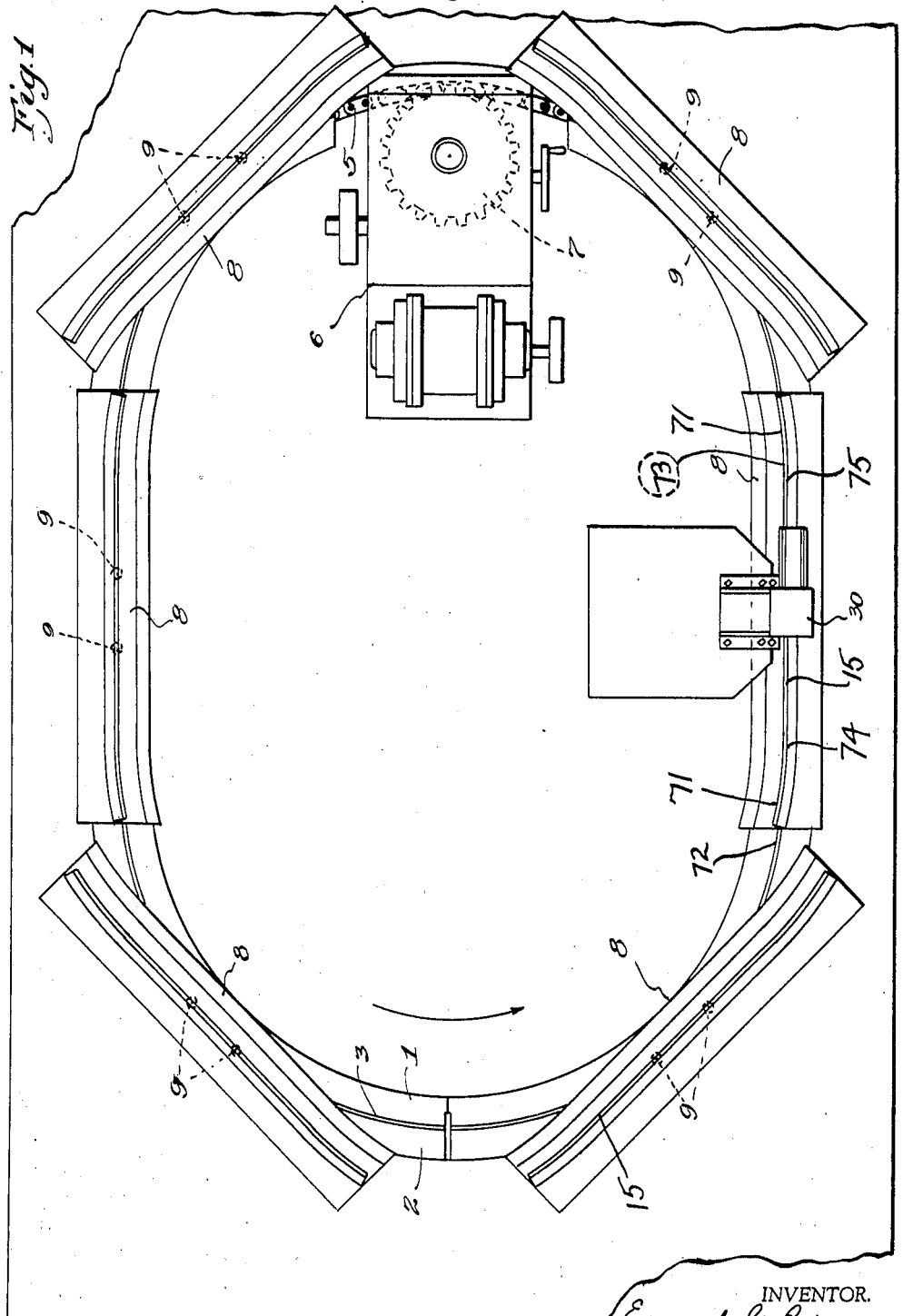
Fig. 1 is a plan view showing the combined welder and work conveyor.

This invention relates particularly to a repeat spot welding machine wherein the work to be welded is loaded on a conveyor at a loading station, the conveyor then carries the work to the welding machine where it is welded, and then the conveyor carries the work on to the unloading station. Any suitable and well-known conveyor may be used for carrying the work through the above-mentioned course of travel.

By way of description rather than of limitation, there is shown a conveyor comprising a trackway in the form of a pair of flat tracks 1 and 2 which are positioned side by side having their adjacent edges spaced to form the slot 3. The tracks 1 and 2 are endless and as herein shown extend about an elliptical course. The tracks are supported by a frame generally designated 4. A traveling conveyor chain 5 is supported beneath the tracks 1 and 2 and driven by any suitable driving mechanism such as the Reeves drive, generally designated 6, having a driving gear 7 which meshes with the conveyor chain 5. A plurality of jigs, generally designated 8, are slidably mounted upon the tracks 1 and 2. Each jig is connected at longitudinally spaced points to the conveyor chain 5 by the pins 9. Thus, the conveyor chain drives the jigs 8 along the tracks 1 and 2 about an elliptical course. Each jig comprises a copper bar 12 which is fixed intermediate a pair of angle iron plates 10 and 11 which slide along the tracks 1 and 2. The copper bar 12 serves as the lower electrode during the welding operation.

The work to be welded in this particular form of the machine comprises a pair of metal plates 13 and 14 having flanges 15 and 16 respectively. The plates 13 and 14 are arranged to be mounted over the electrode 12 and clamped or otherwise secured to the jig with their flanges 15 and 16 overlapping as shown in Fig. 2. A pair of opposed rollers 17 and 18 are mounted upon opposed oblique plungers 19 and 20 which are urged towards each other and against the work by the springs 21 and 22. During the welding operation the rollers 17 and 18 press the plates 13 and 14 tightly against the electrode 12.

This invention contemplates a repeat welder which will spot weld the work at spaced points while the work is moving through the welder. The work preparatory to the flow of current therethrough from one electrode to the other should first be tightly pressed together, and this pressure should continue during the flow of current through the electrodes and work to heat the work to welding temperatures and should continue for a suitable time after the current is shut off to finish the welding operation.

It is the object of this invention to effect the weld more accurately and more efficiently than heretofore known in the art. To effect the welding operation it is proposed to use an upper electrode which engages the work and presses it against the lower electrode. The upper electrode holder and tip are arranged to travel with the work throughout the period that the electrode is in contact with the same. To this end it is proposed to use an upper electrode holder 25 having an electrode tip 26. The upper electrode holder 25 takes the form of a plunger which is mounted for rectilinearly reciprocating motion in the cylinder 27. The cylinder 27 is pivotally mounted at its upper end 28 on the pin 29 which is carried by the fixed bracket 30. The pin 29 extends across the line of travel of the work and thus permits the cylinder, electrode holder 25 and tip 26 to swing forwardly in the direction of travel of the work and rearwardly in the reverse direction. The cylinder 27 is swung reversely of the direction of travel of the work by the compression spring 31 which is mounted over a rod 32 which is pivotally connected as at 33 to the cylinder 27 at one end and has a sliding swivelling connection with the bracket 30 as at 34. During the welding operation and while the electrode tip 26, holder 25, and cylinder 27 are traveling with the work, the rod 32 slides longitudinally through the swivel connection 34 compressing the spring 31. After the electrode tip 26 is retracted from the work the spring 31 returns the cylinder, holder and tip to original or starting position, shown in Fig. 6. The return stroke of these members is stopped by the nut 70 screwed on the threaded end of the rod 32. The length of the return stroke can be varied by screwing or adjusting the nut 70 along the rod 32.

Any suitable arrangement can be used for rectilinearly reciprocating the upper electrode 25. The important thing is that the electrode should be arranged so that it can swing forwardly in the direction of travel of the work in a plane passing through the points at which the upper and lower electrodes weld the work (this plane, as herein shown, happens to be a vertical plane and is perpendicular to the horizontal flanges 15 and 16) and reversely thereof and so that it can reciprocate toward and away from the work in this same plane.

Any suitable means can be used for reciprocating the upper electrode 25 and controlling the flow of current from one electrode to the other and through the work. The reciprocation of the reciprocating electrode 25 and the flow of current through the work from one electrode to the other must be timed or synchronized. However, by pivotally mounting the cylinder 27, electrode holder 25, and tip 26, the need for synchronizing the speed of travel of the tip 26 with the speed of the work is eliminated. The tip 26 upon contacting the work automatically travels at the same speed as the work. This timed operation of the reciprocating electrode and the flow of current is preferably achieved by an apparatus such as shown in my copending application Serial No. 58,916, filed January 13, 1936, or one similar thereto, such as shown in the application of John Abplanalp, Serial No. 65,332, filed February 24, 1936, wherein an automatic air operated valve is combined with other mechanism for automatically and pneumatically bringing the electrodes together, automatically switching on the current and properly timing the same, and automatically withdrawing the electrodes and then repeating this cycle of operation. Such an automatic air operated valve is controlled by the bell crank valve lever 35 which is pivotally supported on the frame of the machine and which is actuated by cams 36 and 37 positioned at the front and rear ends respectively of each jig 8. The secondary or welding circuit is completed from the transformer 38 through the conductor bar 39 to the flexible laminated spring conductor 40 (Fig. 4), the upper electrode 25, the work 13, 14, the lower electrode 12, brushes 41, bus bar 42, thence through conductor bracket 43 to the transformer.

The construction shown in Figs. 5 through 12 is the same as that above described with the exception that the work 13, 14 is held upon the lower electrode 12 during the welding operation by means of a spool 44 having converging cam faces 45. The spool 44 is rotatably mounted upon the plunger 46 which is reciprocably mounted in the air cylinder 47 which is connected to a source of compressed air or other fluid by the line 48. The valve which controls the admission of fluid under pressure into the cylinder 47 is controlled by the bell crank 49 pivotally supported on the frame of the welding machine. This bell crank 49 is also operated by the cams 36 and 37 carried by each of the jigs 8.

The operation of the device will now be described. The jigs 8 are moved continuously along the tracks 1 and 2 in an elliptical course by the conveyor chain 5 and drive 6. The portion of the trackway 1 and 2 at and for a short distance to the left and right (Fig. 1) of the welder electrodes is preferably straight so that the work 13 and 14 travels in a rectilinear path through the welder. The straightaway portion of the slot 3 extends roughly from point 74 to point 75. It will be noted that the metal plates 13 and 14 curve inwardly at their outer ends as at 71. Since the welding tip 26 travels fore and aft in a substantially rectilinear path, the jig 12 and the work must be shifted so that the electrode tip 26 can negotiate the curves 71 while traveling rectilinearly. To this end the trackways 1 and 2, and particularly the guiding groove 3, is curved along two short portions of its length as at 72 just to the left of the straightaway portion 74, 75 and as at 73 just to the right of this straightaway portion. The curved portions 72 and 73 of the groove 3 correspond to the curvature of the end portions 71 of the work. These curved portions 72 and 73 cooperate with the pins 9 to shift the jig as the work enters and leaves the electrodes so that the curved ends 71 of the work and jig will travel rectilinearly during each welding operation while the work is clamped between the electrodes. When the forward end of the jig reaches the electrode, the forward pin 9 enters the straightaway portion 74, 75 and the rear pin 9 is in the curved portion 72 of the slot 3. As the jig travels the rear pin 9 cooperates with the groove 3 to continuously straighten out the jig as it travels by the electrode 26. As the rear end of the jig reaches the upper electrode 26, the rear pin 9 is in the straightaway portion of the slot 3 and the front pin 9 enters the curved portion 73 of the slot 3. Thus, the forward pin 9 now cooperates with the curved portion 73 of the slot to swivel the jig about rear pin 9 and straighten the jig out as the curved rear end of the work travels by the upper electrode, that is, the pins 9 cooperate with the slot 73 to shift the jig and work so that the area of the work clamped between the electrodes travels approximately in a straight line while clamped between the electrodes. The lower electrode 12 moves in a rectilinear path across the direction of reciprocation of the upper electrode 25 and does not move either upwardly or downwardly. The work 13 and 14 is loaded on the jig at any point prior to reaching the welder.

As shown in Fig. 6 the loaded jig 8, traveling in the direction of the arrow, is about to pass under the upper electrode 25. At this time both bell crank levers 35 and 49 are in the position shown in the full lines. As soon as the cam 36 swings bell crank lever 49 to the dotted line position, Fig. 6, fluid under pressure is admitted into the cylinder 47 and the spool 44 is forced downwardly to the dotted line position, Fig. 6, to the full line position, Fig. 3, thus pressing the flanges 15 and 16 together and tightly down upon the upper face 50 of the lower electrode 12. As the jig 8 travels further in the direction of the arrow, Fig. 6, the cam 36 next swings the bell crank lever 35 counter-clockwise to the position shown in Fig. 7.

When the lever 35 is swung to the position shown in Fig. 7, this opens the air valve and the mechanism shown, described and claimed in the above mentioned Beiderman and Abplanalp applications, causing the properly timed reciprocation of the upper electrode 25 and flow of current from one electrode to the other through the work. As soon as the lever 35, which controls the automatic air valve, is swung to the position shown in Fig. 7, the upper electrode is projected downwardly by the admission of fluid under pressure into the cylinder 27 and the electrode tip 26 engages the work to the left of vertical or center line position as shown in Fig. 12.

The position of the electrode 26 as it engages the work is shown by the line A. As soon as the electrode 25 engages the work 15 it immediately travels in the direction of the arrow with the work thereby causing the electrode 25 and cylinder 26 to swing counter-clockwise about the pin 29. Before reaching the center line position, preferably when the electrode 25, 26 reaches the position indicated by line B, the welding circuit is closed and current flows from the electrode 26 through the work to the lower electrode 12. The current continues to flow until the electrode 25, 26 swings past center to the position indicated by the line C. At this time the current is automatically turned off, that is, the welding circuit broken by any suitable means, preferably such as described in the above-mentioned applications. However, the fluid pressure in the cylinder 27 is maintained thus holding the electrode 26 in contact under pressure with the work 13, 14 until it reaches a point D whereupon the fluid pressure is released from the cylinder 27 and the electrode 26 retracted from the work 15, 16. As soon as the electrode 26 is disengaged from the work 15, 16, the compression spring 31 expands and immediately swings the cylinder 27 and electrode 25 to the left, as viewed in Fig. 12, back to the starting position, shown in Fig. 6. The fluid pressure in the air cylinder 27, that is, the pressure that the electrode 26 exerts against the work 15 is substantially constant from the position A through the center line position and to the point indicated by line D whereupon it is retracted from the work. This welding cycle is repeated and the plates 13 and 14 spot welded throughout the length of flanges 15 and 16 and approximately along the longitudinal center line of these flanges.

This cycle of welding operation, to wit: the projection of the electrode 26 into engagement with the work, the travel of the electrode 26 with the work, and the swinging of the same in the cylinder 27 about the pivot 29, the flow of the welding current through the electrodes and the work, and finally the retraction of the electrode from the work is repeated by the mechanism described in the above-mentioned copending application, and this cycle is continued until the cam 37, as the work travels in the direction of the arrow, Fig. 11, swings the lever 35 from the full line position to the dotted line position whereupon the electrode 26 is retracted, the electrode 26 and cylinder 27 swung to the left or starting position by spring 31, and the switch of the primary welding circuit turned to off position. Before the cam 37 reaches the bell crank 35 it first swings the bell crank 49 from the position shown in Fig. 10 to that shown in Fig. 11, thus exhausting the fluid under pressure from the cylinder 47 which causes the spool 44 to be lifted from the work.

It will be noted that during the engagement of the upper electrode 26 with the work, the electrode not only swings about the pivot 29 but that it travels rectilinearly inwardly of the cylinder 27 until it reaches center line position whereupon it again travels outwardly of the cylinder 27 until it reaches the position indicated by the line D.

It will be noted that the electrode tip 26, due to the fact that it is mechanically rather than manually supported, has a rolling contact with the work, and the same points on the surface of the electrode tip 26 engage the work during each welding cycle. This causes the lower ends of the electrode tips 26 to mushroom or wear along an approximately cylindrical surface. This not only at all times insures a point contact between the electrode contact and the tip which concentrates the welding heat but also in actual operation has given the electrode tips an appreciably greater life.

I claim:

1. In an electrical welding apparatus the combination comprising a support and an electrode swingably and reciprocably mounted on said support for engaging one side of the material to be welded, said electrode being swingable in the direction of travel of said work and reversely thereof and reciprocable toward and away from one side of the material transversely of the direction of travel of the said material, a second electrode opposed to said first electrode for engaging the opposite side of said material and cooperating with said first electrode to clamp the material during the welding operation, mechanism for feeding the material to be welded unidirectionally, and means for reciprocating said first electrode, said means during each cycle of operation of the apparatus projecting said first electrode into engagement with said material to be welded whereby said material is clamped between the said electrodes for welding and serves as the sole means for advancing the swinging electrode with said material whereupon said means retracts the first electrode from the said material, and means for swinging the said electrode reversely of the direction of travel of said material after welding to its initial position.

2. In an electrical welding apparatus the combination comprising a support and an electrode swingably and reciprocably mounted on said support for engaging one side of the material to be welded, said electrode being swingable in the direction of travel of said work and reversely thereof and reciprocable toward and away from one side of the material transversely of the direction of travel of the said material, a second electrode opposed to said first electrode for engaging the opposite side of said material and cooperating with said first electrode to clamp the material during the welding operation, mechanism for continuously feeding the material to be welded unidirectionally, and means for reciprocating said first electrode, said means during each cycle of operation of the apparatus moving said first electrode into engagement with said material to be welded whereby said material is clamped between the said electrodes for welding and serves as the sole means for advancing the swinging electrode with said material whereupon said means retracts the first electrode from the said material, and means for swinging the said electrode reversely of the direction of travel of said material after welding to its initial position.

3. In an electrical welding machine for welding advancing work, opposed electrodes for clamping the work on opposite sides and advancing with the work, a support for one electrode pivoted to swing forwardly in the direction the work advances and reversely thereof, and a holder for said same electrode mounted on said pivoted support for reciprocation toward and away from said work and other electrode whereby said reciprocating electrode can be projected against said work to clamp the work against said other electrode, the said reciprocable electrode as thus engaged with the work being advanced solely by and with said work to swing the support and holder about said pivot until said electrode is retracted to release said work.

4. In an electrical welding machine for welding advancing work, opposed electrodes for clamping the work on opposite sides and advancing with the work, a support for one electrode pivoted to swing forwardly in the direction the work advances and reversely thereof, and a holder for said same electrode mounted on said pivoted support for rectilinear reciprocation toward and away from said work and other electrode whereby said reciprocating electrode can be projected against said work to clamp the work against said other electrode, the said reciprocable electrode as thus engaged with the work being advanced solely by and with said work to swing the support and holder about said pivot until said electrode is retracted to release said work, and means operable after the electrode is retracted from the work to swing the support and electrode holder about said pivot reversely of the direction of travel of said advancing work.

5. In an electrical welding machine for spot welding advancing work, opposed electrodes for clamping the work on opposite sides and advancing with the work, one of said electrodes being arranged to travel rectilinearly and support the work in a single plane during the welding operation, a support for the other electrode pivoted to swing forwardly in the direction the work advances and reversely thereof, and a holder for said other electrode slidably mounted on the said pivoted support for reciprocation toward and away from said work and first mentioned electrode whereby said reciprocating electrode can be projected against said work to clamp the work against said first mentioned electrode, the said reciprocable electrode as thus engaged with the work being advanced solely by and with said work during welding to swing said support and holder about said pivot until said reciprocating electrode is retracted to release said work and whereby the portions of said electrodes in contact with the work travel in parallel planes spaced a distance equal to the thickness of the work.

6. In an electrical welding machine for welding work which advances relative to the welding machine during welding, a frame for said machine, opposed electrodes for clamping the work on opposite sides, the first of said electrodes serving as a support for the work, a support for the second of said electrodes pivoted on the said frame to swing forwardly in the direction of relative movement between the work and the frame during welding and reversely thereof, a holder for the said second electrode mounted on said pivoted support for reciprocation toward and away from said work and first electrode whereby the said reciprocating electrode can be projected against the work to clamp the work against said first electrode and remain in contact with the work during said relative movement between the work and the welder frame whereby the frame and work during their relative movement serve as the sole means for swinging the support and holder about the said pivot until the said electrode is retracted to release said work.

7. In an electric welding machine for making a line of spot welds, a combination of means for supporting and moving work having a planular surface and including one electrode and a companion electrode continuously reciprocating at substantially right angles to the work, said electrode adapted to momentarily engage and grip the planular work and pass a shot of electric energy through the work while traveling along therewith, the reciprocation of the electrode serving to separate the electrode from the work and means for returning the electrode to its initial position from which it repeats its said operation, whereby a line of spot welds is afforded whose spacing is dependent upon the speed of travel of the work and the rate of reciprocation of the electrode.

8. In an electric welding machine for making a line of spot welds, means for supporting and moving the work including one electrode which travels continuously in one direction and a companion electrode which is continuously reciprocating while in operation, said companion electrode adapted to momentarily engage and grip the work and travel along with the work and the electrode and then, upon the reverse movement of the electrode, release the work, means for automatically returning the electrode to its initial position before the electrode again moves into contact with the work in its repeat operation, whereby a line of spot welds is afforded whose spacing is dependent upon the speed of travel of the work and the rate of reciprocation of the electrode.

EDWARD G. BEIDERMAN.